(12) United States Patent
Kaneda et al.

(10) Patent No.: US 11,279,990 B2
(45) Date of Patent: Mar. 22, 2022

(54) ALUMINUM ALLOY AND FASTENER MEMBER

(71) Applicants: NHK SPRING CO., LTD., Kanagawa (JP); TOPURA CO., LTD., Kanagawa (JP)

(72) Inventors: Noriyoshi Kaneda, Kanagawa (JP); Takeshi Suzuki, Kanagawa (JP); Kouhei Miyamoto, Kanagawa (JP); Naoki Horiuchi, Kanagawa (JP)

(73) Assignees: NHK SPRING CO., LTD., Kanagawa (JP); TOPURA CO., LTD., Kanagawa (JP)

( * ) Notice: Subject to any disclaimer, the term of this patent is extended or adjusted under 35 U.S.C. 154(b) by 681 days.

(21) Appl. No.: 15/999,785

(22) PCT Filed: Feb. 16, 2017

(86) PCT No.: PCT/JP2017/005750
§ 371 (c)(1),
(2) Date: Aug. 20, 2018

(87) PCT Pub. No.: WO2017/142030
PCT Pub. Date: Aug. 24, 2017

(65) Prior Publication Data
US 2019/0316230 A1  Oct. 17, 2019

(30) Foreign Application Priority Data

Feb. 19, 2016  (JP) .............................. JP2016-030423

(51) Int. Cl.
*C22C 21/14* (2006.01)
*C22C 21/16* (2006.01)
(Continued)

(52) U.S. Cl.
CPC .............. *C22C 21/02* (2013.01); *C22C 21/00* (2013.01); *C22C 21/14* (2013.01); *C22C 21/16* (2013.01);
(Continued)

(58) Field of Classification Search
CPC ................................ C22C 21/08; C22C 21/14
See application file for complete search history.

(56) References Cited

U.S. PATENT DOCUMENTS

| | | | |
|---|---|---|---|
| 2004/0084119 A1* | 5/2004 | Sano | C22C 21/02 148/689 |
| 2012/0156089 A1* | 6/2012 | Gejima | C22C 21/08 420/532 |
| 2017/0314113 A1* | 11/2017 | Skubich | C22F 1/05 |

FOREIGN PATENT DOCUMENTS

| | | |
|---|---|---|
| CN | 102482737 A | 5/2012 |
| JP | 3939414 B2 | 7/2007 |

(Continued)

OTHER PUBLICATIONS

Davis, J.R. "Aluminum and Aluminum Alloys", ASM International, p. 22-23. (Year: 1993).*
(Continued)

*Primary Examiner* — George Wyszomierski
*Assistant Examiner* — Janell C Morillo
(74) *Attorney, Agent, or Firm* — Greenblum & Bernstein, P.L.C.

(57) ABSTRACT

An aluminum alloy contains 0.7% to 1.8% of silicon, 0.5% to 2.1% of copper, 0.4% to 1.8% of manganese, 0.6% to 1.6% of magnesium, and 0.1% to 0.7% of zinc in terms of mass ratio and the balance aluminum with inevitable impurities.

5 Claims, 2 Drawing Sheets

(51) Int. Cl.

| | |
|---|---|
| *C22C 21/18* | (2006.01) |
| *C22C 21/08* | (2006.01) |
| *C22C 21/02* | (2006.01) |
| *C22C 21/00* | (2006.01) |
| *C22F 1/043* | (2006.01) |
| *C22F 1/057* | (2006.01) |
| *F16B 19/06* | (2006.01) |
| *F16B 35/00* | (2006.01) |
| *F16B 37/00* | (2006.01) |

(52) U.S. Cl.
CPC .............. *C22C 21/18* (2013.01); *C22F 1/043* (2013.01); *C22F 1/057* (2013.01); *F16B 19/06* (2013.01); *F16B 35/00* (2013.01); *F16B 37/00* (2013.01)

(56) References Cited

FOREIGN PATENT DOCUMENTS

| JP | 2010-189750 A | 9/2010 |
|---|---|---|
| JP | 2011-252212 A | 12/2011 |
| JP | 5495183 B2 | 5/2014 |
| JP | 2015-124409 A | 7/2015 |
| JP | 2015-166480 A | 9/2015 |
| WO | 2011/114591 A1 | 9/2011 |
| WO | 2013/073575 A1 | 5/2013 |

OTHER PUBLICATIONS

Chinese Decision of Rejection in Chinese Patent Application No. 201780011760.4, dated Aug. 20, 2020 with English translation.

Hu Runan, "Practical Chrome Plating Technology," Chen Songqi National Defense Industry Press, Jul. 31, 2005, pp. 45-46.

Ning et al., "Electrolytic Aluminum Production," Metallurgical Industry Press, Sep. 30, 2015, pp. 221.

"AA 6056 Strength and machinability for a low cost solution", Alcan News, Alcan Canada Products, Canada, vol. AA6056, XP003033020, Jun. 1, 2008, pp. 1-2.

Isao Iwayima et al., "6056 Aluminum Alloy Wire for Automotive Fasteners", SEI Technical Review, XP055391532, Oct. 1, 2013, pp. 74-78.

Official Communication (European Search Report) dated May 31, 2019 for EP Patent Application No. 17753285.0.

Chinese Office Action for Chinese Patent Application No. 201780011760.4, dated Aug. 30, 2019, and English-language translation thereof.

"International Designation System for Wrought Aluminium and Wrought Aluminium Alloys", JIS Handbook 3 Non-Ferrous Metals & Metallurgy, Japanese Standards Association, Jan. 19, 2007, pp. 1260-1261, 1269, 1273.

International Search Report issued with respect to Patent Application No. PCT/JP2017/005750, dated May 23, 2017.

International Preliminary Report on Patentability issued with respect to Patent Application No. PCT/JP2017/005750, dated Aug. 21, 2018.

\* cited by examiner

ALUMINUM ALLOY AND FASTENER MEMBER

FIELD

The present invention relates to an aluminum alloy and a fastening member made of the aluminum alloy.

BACKGROUND

As one of the measures for achieving improvement in the fuel efficiency of automobiles, the weight reduction of various kinds of parts has been conventionally pursued. Aluminum alloys have been used in place of cast iron as materials for engine blocks, or magnesium alloys have been used in place of steel as materials for engine covers and oil pans, for example.

When parts made of the aluminum alloy or the magnesium alloy are fastened together by conventional steel bolts, looseness is likely to occur caused by the fact that the difference between the coefficient of linear expansion of the aluminum alloy or the magnesium alloy and the coefficient of linear expansion of steel is large, and besides, corrosion caused by contact between different kinds of metals is also likely to occur. Given these circumstances, to ensure the reliability of fastening, the shaft length of the steel bolts is required to be increased with screw holes of the parts deepened, or the diameter of the steel bolts is required to be increased. However, while the shaft length of the steel bolts has an influence on the wall thickness of the parts, the thickness of the diameter of the steel bolts has an influence on the width of a flange in which the screw holes of the parts are provided, and using the steel bolts for fastening the parts made of the aluminum alloy or the magnesium alloy constitutes an obstacle to pursuing weight reduction.

To solve such steel bolts-related problems, there has also been a movement to employ bolts made of aluminum alloys as fastening members for fastening the parts made of the aluminum alloy or the magnesium alloy together (refer to Patent Literature 1 and Patent Literature 2, for example). The bolts made of the aluminum alloy have a small difference in the coefficient of linear expansion relative to the aluminum alloy and the magnesium alloy forming various kinds of parts and produces little galvanic corrosion and can thus ensure the reliability of fastening even when the screw holes of the parts are shallowed or the diameter of the bolts is decreased, which is thus preferred for weight reduction.

Patent Literature 1 discloses a fastening member made of the 6000 series aluminum alloy having a strength of about 400 MPa in terms of tensile strength required as a fastening member. As an aluminum alloy having higher strength than that of Patent Literature 1, Patent Literature 2 discloses a fastening member made of the 6000 series aluminum alloy having a strength of 450 MPa or higher in terms of tensile strength by causing it to contain silicon, iron, manganese, zinc, vanadium, and the like with their contents within specific ranges.

CITATION LIST

Patent Literature

Patent Literature 1: Japanese Patent No. 3939414
Patent Literature 2: Japanese Patent No. 5495183

SUMMARY

Technical Problem

However, the aluminum alloy disclosed in Patent Literature 2 contains vanadium and thus causes a problem in that it is poor in toughness, although it increases hardness by vanadium and can thus increase strength.

The present invention has been made in view of the foregoing, and an object thereof is to provide an aluminum alloy and a fastening member having improved strength and toughness.

Solution to Problem

To solve the above-described problem and achieve the object, an aluminum alloy according to the present invention includes, in terms of mass ratio: 0.7% to 1.8% of silicon; 0.5% to 2.1% of copper; 0.4% to 1.8% of manganese; 0.6% to 1.6% of magnesium; 0.1% to 0.7% of zinc; and the balance aluminum with inevitable impurities.

Moreover, in the above-described aluminum alloy according to the present invention, the copper is contained in an amount of 1.5% to 2.1% in terms of mass ratio.

Moreover, in the above-described aluminum alloy according to the present invention, the manganese is contained in an amount of 1.2% to 1.8% in terms of mass ratio.

Moreover, in the above-described aluminum alloy according to the present invention, the silicon is contained in an amount of 1.4% to 1.8% in terms of mass ratio, and the magnesium is contained in an amount of 1.2% to 1.6% in terms of mass ratio.

Moreover, the above-described aluminum alloy according to the present invention includes, in terms of mass ratio: 1.4% to 1.8% of the silicon; 1.5% to 2.1% of copper; 1.2% to 1.8% of the manganese; 1.2% to 1.6% of the magnesium; and 0.1% to 0.7% of zinc.

Moreover, the above-described aluminum alloy according to the present invention further includes at least one selected from the group consisting of, in terms of mass ratio: 0.05% to 0.15% of nickel; 0.05% to 0.15% of cobalt; and 0.05% to 0.3% of titanium.

Moreover, a fastening member according to the present invention fastens a plurality of members together, and the fastening member is made of the aluminum alloy according to any one of the above-described inventions.

Moreover, in the above-described fastening member according to the present invention, the fastening member has a tensile strength of 470 MPa or higher.

Advantageous Effects of Invention

The present invention can provide an aluminum alloy and a fastening member having improved strength and toughness.

DESCRIPTION OF EMBODIMENTS

The following describes modes for performing the present invention (hereinafter, referred to as "embodiments") with reference to the accompanying drawings. The drawings are schematic, and the relation between the thickness and width of each part, the ratios in thickness of individual parts, and the like may be different from actual ones. Also between the drawings, some parts the mutual dimensional relation or ratio of which are different may be included.

First Embodiment

Figure 1:
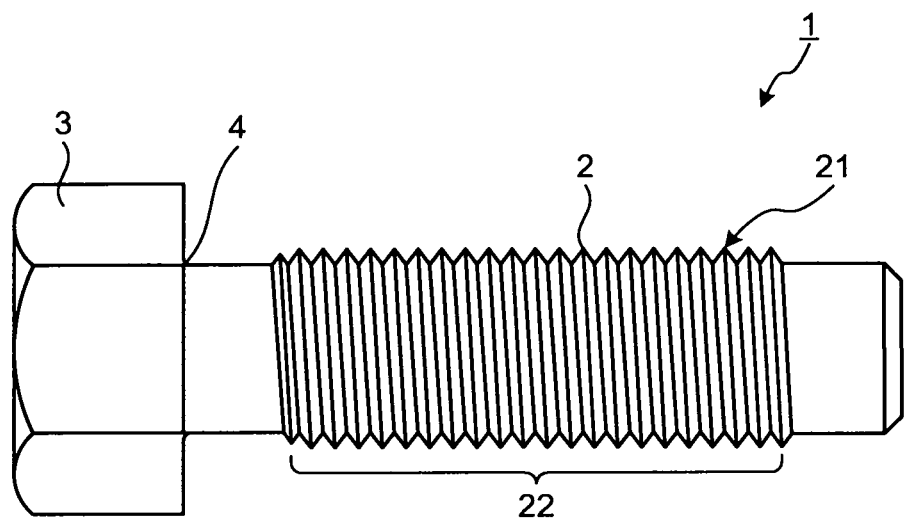
FIG. 1 is a side view of a structure of a fastening member according to a first embodiment of the present invention.

FIG. 1 is a side view of a structure of a fastening member according to a first embodiment of the present invention. This fastening member 1 illustrated in FIG. 1 is a bolt (a kind of a male screw) made of an aluminum (Al) alloy. The fastening member 1 includes a cylindrical shaft 2, a head 3 provided on one end in an axial direction of the shaft 2 (the right-and-left direction in FIG. 1), and a neck 4 forming a boundary between the shaft 2 and the head 3. The shaft 2 has a screw part 22 formed with a screw thread 21 on its surface. The shape (a hexagonal trim shape) of the head 3 is only by way of example and may have other shapes (a hexagonal flange shape, a pan shape, a dish shape, a truss shape, a flat shape, and the like).

The fastening member 1 is made of an aluminum alloy containing silicon (Si), copper (Cu), manganese (Mn), magnesium (Mg), zinc (Zn), and the balance aluminum (Al) with inevitable impurities. Specifically, the aluminum alloy according to the present embodiment contains 0.7% to 1.8% of Si, 0.5% to 2.1% of Cu, 0.4% to 1.8% of Mn, 0.6% to 1.6% of Mg, and 0.1% to 0.7% of Zn in terms of mass ratio. The aluminum alloy according to the present embodiment may contain at least one element selected from the group consisting of 0.05% to 0.15% of nickel (Ni), 0.05% to 0.15% of cobalt (Co), and 0.05% to 0.3% of titanium (Ti). In the following description, a content indicates a containing ratio in terms of mass ratio.

$Mg_2Si$ is precipitated from Si by aging treatment and strength can be increased by the precipitation of $Mg_2Si$. In particular, when a Mg content is 1.2% to 1.6%, and a Si content is 1.4% to 1.8%, the amount of a $Mg_2Si$ precipitate can be further increased, and strength can be further increased, which is thus preferable. Meanwhile, when the Si content exceeds 1.8%, the elongation of the alloy is decreased. When the Si content is less than 0.7%, the strength increasing effect by the $Mg_2Si$ precipitate is insufficient.

$CuAl_2$ and/or $Al_2CuMg$ are precipitated from Cu by aging treatment and strength can be increased by the precipitates. In particular, when a Cu content is 1.5% to 2.1%, the amount of these precipitates can be further increased, and strength can be further increased. Meanwhile, when the Cu content exceeds 2.1%, the corrosion resistance, stress corrosion cracking resistance, and elongation of the alloy are decreased. When the Cu content is less than 0.5%, the strength increasing effect by these precipitates is insufficient.

Mn is an element that exhibits solid solution strengthening and produces Al—Mn—Si-based precipitates by aging treatment, and strength can be increased. In particular, when a Mn content is 1.2% to 1.8%, the amount of these precipitates can be further increased, and strength can be further increased. Meanwhile, when the Mn content exceeds 1.8%, the elongation of the alloy is decreased. When the Mn content is less than 0.4%, the strength increasing effect by these precipitates is insufficient.

$Mg_2Si$ is precipitated from Mg by aging treatment and strength can be increased. In particular, when the Si content is 1.4% to 1.8%, and the Mg content is 1.2% to 1.6%, the amount of the $Mg_2Si$ precipitate can be further increased, and strength can be further increased. Meanwhile, when the Mg content exceeds 1.6%, elongation is decreased. When the Mg content is less than 0.6%, the strength increasing effect by the $Mg_2Si$ precipitate is insufficient.

$MgZn_2$ is precipitated from Zn by aging treatment and strength can be increased. When a Zn content exceeds 0.7%, the corrosion resistance, stress corrosion cracking resistance, and elongation of the alloy are decreased. When the Zn content is less than 0.1%, the strength increasing effect by these precipitates is insufficient.

Ni is an element that forms precipitates with Al, Fe, Cu, and the like to improve heat resistance and can be added as needed. When a Ni content exceeds 0.15%, corrosion resistance, stress corrosion cracking resistance, and elongation are decreased. When the Ni content is less than 0.05%, the strength increasing effect by these precipitates is insufficient.

Co is an element that forms precipitates with Al and the like to improve heat resistance and can be added as needed. When a Co content exceeds 0.15%, the elongation of the alloy is decreased. When the Co content is less than 0.05%, the strength increasing effect by these precipitates is insufficient.

Ti is an element that increases strength through micronization of a cast structure and can be added as needed. When a Ti content exceeds 0.3%, the elongation of the alloy is decreased. When the Ti content is less than 0.05%, the strength increasing effect by micronization of the structure is insufficient.

The fastening member 1 made of the aluminum alloy containing 0.7% to 1.8% of Si, 0.5% to 2.1% of Cu, 0.4% to 1.8% of Mn, 0.6% to 1.6% of Mg, 0.1% to 0.7% of Zn, and the balance Al with inevitable impurities has a tensile strength of 470 MPa or higher and 800 MPa or below. In addition, the fastening member 1 has a 0.2% proof stress of 400 MPa or higher and an elongation at break of 12% or less, which has thus improved toughness.

The fastening member 1 is formed by performing wire-drawing processing, header processing, or the like on a rod-shaped member made of the aluminum alloy. When the fastening member 1 is formed by performing the wiredrawing processing and the header processing on the rod-shaped member, fiber flows, in which metallic crystals are elongated in a fiber form along the surface shape, are observed on the screw part 22. When a crack occurs on the screw part 22, the crack advances across the fiber flows. Consequently, the presence of the fiber flows can inhibit stress corrosion cracking.

The first embodiment of the present invention described above manufactures the fastening member 1 using the aluminum alloy containing 0.7% to 1.8% of Si, 0.5% to 2.1% of Cu, 0.4% to 1.8% of Mn, 0.6% to 1.6% of Mg, 0.1% to 0.7% of Zn, and the balance aluminum (Al) with inevitable impurities and can thereby provide a fastening member having improved strength and toughness.

Second Embodiment

Figure 2:
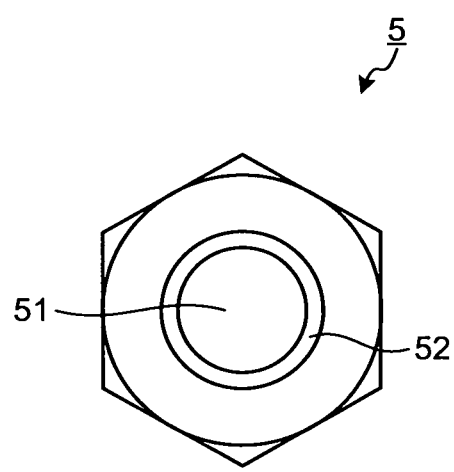
FIG. 2 is a plan view of a structure of a fastening member according to a second embodiment of the present invention.

FIG. 2 is a plan view of a structure of a fastening member according to a second embodiment of the present invention. This fastening member 5 illustrated in FIG. 2 is a nut (a kind of a female screw) made of the aluminum alloy. The fastening member 5 has a hollow cylindrical shape, in which a screw thread 52 is formed on an inner face of a hole 51 formed at the central part thereof. The shape (a hexagonal nut) of the fastening member 5 illustrated in FIG. 2 is only by way of example and can also be embodied as nuts having other shapes (a flange-equipped nut, a cap nut, a high nut, and the like).

The fastening member 5 is formed using the aluminum alloy and is formed in a ring shape. The fastening member 5 is formed by performing wiredrawing processing, core hollowing processing, header processing, or the like on a rod-shaped member made of the aluminum alloy.

The second embodiment of the present invention described above manufactures the fastening member 5 using the aluminum alloy containing 0.7% to 1.8% of Si, 0.5% to 2.1% of Cu, 0.4% to 1.8% of Mn, 0.6% to 1.6% of Mg, 0.1% to 0.7% of Zn, and the balance aluminum (Al) with inevitable impurities and can thereby provide a fastening member having improved strength and toughness in a manner similar to the first embodiment.

Third Embodiment

Figure 3:
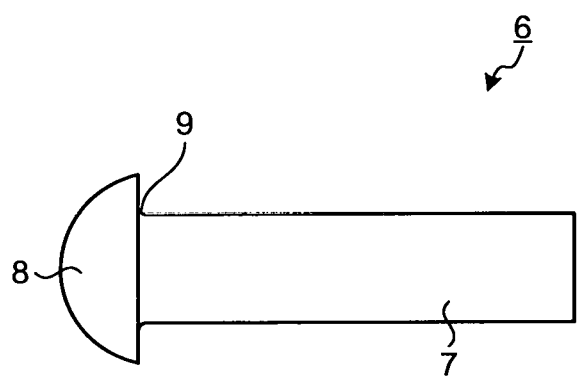
FIG. 3 is a side view of a structure of a fastening member according to a third embodiment of the present invention.

FIG. 3 is a side view of a structure of a fastening member according to a third embodiment of the present invention. This fastening member 6 illustrated in FIG. 3 is a rivet made of the aluminum alloy. The fastening member 6 includes a cylindrical shaft 7, a head 8 provided on one end in a height direction of a cylinder forming the shaft 7 (the right-and-left direction in FIG. 3), and a neck 9 forming a boundary between the shaft 7 and the head 8. The shape (a round shape) of the head 8 illustrated in FIG. 3 is only by way of example and may have other shapes (a dish shape and the like).

The fastening member 6 can be formed by performing wiredrawing processing, header processing, or the like on a rod-shaped member made of the aluminum alloy.

The third embodiment of the present invention described above manufactures the fastening member 6 using the aluminum alloy containing 0.7% to 1.8% of Si, 0.5% to 2.1% of Cu, 0.4% to 1.8% of Mn, 0.6% to 1.6% of Mg, 0.1% to 0.7% of Zn, and the balance aluminum (Al) with inevitable impurities and can thereby provide a fastening member having improved strength and toughness in a manner similar to the first embodiment.

Although the modes for performing the present invention have been described, the present invention should not be limited only by the first to the third embodiments. The fastening member according to the present invention can also be embodied as a machine screw or a tapping screw, which are male screws other than the bolt, for example.

The present invention can thus include various kinds of embodiments that are not described herein, and various kinds of design changes can be made without departing from the technical ideas determined by the scope of claims.

EXAMPLES

The following describes examples of the aluminum alloy according to the present invention. The present invention is not limited to these examples.

First to Tenth Examples and First to Fifth Comparative Examples

Aluminum alloys of the individual compositions listed in Table 1 were melted with an electric furnace and were then cast to obtain ingots. Subsequently, these ingots were heated at a temperature of 500° C. to 560° C. to perform homogenization treatment. Furthermore, the ingots were subjected to hot rolling and wiredrawing processing to obtain wire rods with a diameter of 10 mm to 11 mm. These wire rods were cut into a certain dimension and were subjected to header processing to obtain blanks. The blanks were subjected to solution treatment under a condition with a temperature of 530° C. to 560° C., were subjected to artificial aging at a temperature of 150° C. to 200° C., and were then subjected to rolling to manufacture bolts with a nominal diameter of 8 mm and a pitch of 1.25 mm. These bolts were subjected to a tensile test to determine the tensile strength, 0.2% proof stress, and elongation at break thereof. Table 1 lists the results.

TABLE 1

| | Si | Cu | Mn | Mg | Zn | Ni | Co | Ti | Al | Tensile strength (MPa) | 0.2% Proof stress (MPa) | Elongation at break (%) |
|---|---|---|---|---|---|---|---|---|---|---|---|---|
| First Example | 1.62 | 1.75 | 1.53 | 1.40 | 0.15 | — | — | — | Balance | 513 | 462 | 10 |
| Second Example | 1.59 | 0.65 | 0.65 | 1.44 | 0.21 | — | — | — | Balance | 496 | 417 | 12 |
| Third Example | 0.93 | 0.56 | 1.55 | 0.91 | 0.23 | — | — | — | Balance | 499 | 429 | 12 |
| Fourth Example | 0.89 | 1.81 | 0.56 | 0.82 | 0.20 | — | — | — | Balance | 503 | 443 | 10 |
| Fifth Example | 1.04 | 0.72 | 0.78 | 0.89 | 0.22 | 0.09 | — | — | Balance | 481 | 420 | 10 |
| Sixth Example | 1.02 | 0.72 | 0.76 | 0.88 | 0.34 | — | 0.11 | — | Balance | 478 | 408 | 11 |
| Seventh Example | 1.05 | 0.71 | 0.77 | 0.88 | 0.31 | — | — | 0.16 | Balance | 488 | 405 | 10 |
| Eighth Example | 1.06 | 0.70 | 0.76 | 0.84 | 0.35 | 0.06 | — | 0.19 | Balance | 506 | 449 | 10 |
| Ninth Example | 1.03 | 0.72 | 0.78 | 0.86 | 0.23 | — | 0.08 | 0.18 | Balance | 497 | 436 | 12 |
| Tenth Example | 0.99 | 0.74 | 0.72 | 0.87 | 0.33 | 0.10 | 0.11 | — | Balance | 482 | 409 | 11 |
| First Comparative Example | 0.91 | 0.67 | 0.60 | 0.51 | 0.28 | — | — | — | Balance | 421 | 350 | 14 |
| Second Comparative Example | 0.62 | 0.65 | 0.55 | 0.78 | 0.15 | — | — | — | Balance | 415 | 348 | 14 |
| Third Comparative Example | 0.90 | 0.43 | 0.56 | 0.77 | 0.15 | — | — | — | Balance | 423 | 347 | 14 |

TABLE 1-continued

| | Si | Cu | Mn | Mg | Zn | Ni | Co | Ti | Al | Tensile strength (MPa) | 0.2% Proof stress (MPa) | Elongation at break (%) |
|---|---|---|---|---|---|---|---|---|---|---|---|---|
| Fourth Comparative Example | 0.90 | 0.69 | 0.32 | 0.86 | 0.17 | — | — | — | Balance | 430 | 368 | 15 |
| Fifth Comparative Example | 0.84 | 0.72 | 0.73 | 0.77 | 0.02 | — | — | — | Balance | 457 | 389 | 13 |

First to Fourth Examples

The first to the fourth examples are aluminum alloys containing 0.7% to 1.8% of Si, 0.5% to 2.1% of Cu, 0.4% to 1.8% of Mn, 0.6% to 1.6% of Mg, 0.1% to 0.7% of Zn, and the balance aluminum (Al) with inevitable impurities.

Fifth to Tenth Examples

The fifth to the tenth examples are aluminum alloys containing 0.7% to 1.8% of Si, 0.5% to 2.1% of Cu, 0.4% to 1.8% of Mn, 0.6% to 1.6% of Mg, and 0.1% to 0.7% of Zn and containing at least one selected from the group consisting of 0.05% to 0.15% of nickel (Ni), 0.05% to 0.15% of cobalt (Co), and 0.05% to 0.3% of titanium (Ti) and the balance aluminum (Al) with inevitable impurities.

First to Fifth Comparative Examples

The first to the fifth comparative examples are, relative to the aluminum alloy containing 0.7% to 1.8% of Si, 0.5% to 2.1% of Cu, 0.4% to 1.8% of Mn, 0.6% to 1.6% of Mg, 0.1% to 0.7% of Zn, and the balance aluminum (Al) with inevitable impurities, out of the ranges in terms of any of the elements. Specifically, the first comparative example contains 0.51% of Mg, which is out of the range. The second comparative example contains 0.62% of Si, which is out of the range. The third comparative example contains 0.43% of Cu, which is out of the range. The fourth comparative example contains 0.32% of Mn, which is out of the range. The fifth comparative example contains 0.02% of Zn, which is out of the range.

As to tensile strength, from Table 1, the first to the tenth examples each show 470 MPa or higher, whereas the first to the fifth comparative examples each show less than 470 MPa; it is revealed that the first to the tenth examples satisfy the strength described above and are thus higher in strength. As to 0.2% proof stress and elongation at break, from Table 1, the first to the tenth examples each show a 0.2% proof stress of 400 MPa or higher and an elongation at break of 12% or less, whereas the first to the fifth comparative examples each show a 0.2% proof stress of lower than 400 MPa and an elongation at break of 13% or more; it is revealed that the first to the tenth examples satisfy the strength described above and also have improved toughness.

INDUSTRIAL APPLICABILITY

As described above, the aluminum alloy and the fastening member according to the present invention are suitable for providing a fastening member having improved strength and toughness.

REFERENCE SIGNS LIST 1, 5, 6 Fastening member
2, 7 Shaft
3, 8 Head
4, 9 Neck
21, 52 Screw thread
22 Screw part
51 Hole

The invention claimed is:

1. A fastening member fastening a plurality of members together, wherein the fastening member is made of an aluminum alloy comprising, in terms of mass ratio:
  0.7% to 1.8% of silicon;
  1.5% to 2.1% of copper;
  0.4% to 1.8% of manganese;
  0.6% to 1.6% of magnesium;
  0.1% to 0.7% of zinc
  0.16% to 0.3% of titanium; and
  the balance aluminum with inevitable impurities, and
  wherein the fastening member has a tensile strength of 496 MPa or higher.

2. The fastening member according to claim 1, wherein the manganese is contained in an amount of 1.2% to 1.8% in terms of mass ratio.

3. The fastening member according to claim 1, wherein
  the silicon is contained in an amount of 1.4% to 1.8% in terms of mass ratio, and
  the magnesium is contained in an amount of 1.2% to 1.6% in terms of mass ratio.

4. The fastening member according to claim 1, comprising, in terms of mass ratio:
  1.4% to 1.8% of the silicon;
  1.5% to 2.1% of the copper;
  1.2% to 1.8% of the manganese;
  1.2% to 1.6% of the magnesium;
  0.1% to 0.7% of the zinc; and
  0.16% to 0.19% of the titanium.

5. The fastening member according to claim 1, further comprising at least one selected from the group consisting of, in terms of mass ratio:
  0.05% to 0.15% of nickel;
  0.05% to 0.15% of cobalt.

* * * * *